United States Patent
Rathour et al.

(10) Patent No.: US 12,311,963 B2
(45) Date of Patent: May 27, 2025

(54) VEHICLE CONTROL DEVICE AND VEHICLE CONTROL SYSTEM

(71) Applicant: Hitachi Astemo, Ltd., Hitachinaka (JP)

(72) Inventors: Swarn Singh Rathour, Tokyo (JP); Tasuku Ishigooka, Tokyo (JP); Hideyuki Sakamoto, Tokyo (JP); Takeshi Fukuda, Tokyo (JP); Fumio Narisawa, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 2 days.

(21) Appl. No.: 18/560,584

(22) PCT Filed: Mar. 4, 2022

(86) PCT No.: PCT/JP2022/009299
§ 371 (c)(1),
(2) Date: Nov. 13, 2023

(87) PCT Pub. No.: WO2022/259655
PCT Pub. Date: Dec. 15, 2022

(65) Prior Publication Data
US 2024/0253646 A1   Aug. 1, 2024

(30) Foreign Application Priority Data

Jun. 9, 2021 (JP) ................ 2021-096584

(51) Int. Cl.
*B60W 50/029* (2012.01)
*B60W 50/02* (2012.01)
*B60W 50/00* (2006.01)

(52) U.S. Cl.
CPC ...... *B60W 50/029* (2013.01); *B60W 50/0205* (2013.01); *B60W 50/0225* (2013.01); *B60W 2050/0006* (2013.01)

(58) Field of Classification Search
CPC ........... B60W 50/029; B60W 50/0205; B60W 50/0225; B60W 2050/0006
See application file for complete search history.

(56) References Cited

U.S. PATENT DOCUMENTS 9,563,523 B2    2/2017  Fuhrman et al.
10,459,436 B2 * 10/2019 Samii ................ G05B 23/0286
(Continued)

FOREIGN PATENT DOCUMENTS

JP   2019-111866 A   7/2019
JP   2021-31052 A    3/2021

OTHER PUBLICATIONS

International Search Report (PCT/ISA/210) issued in PCT Application No. PCT/JP2022/009299 dated Apr. 19, 2022 with English translation (4 pages).
(Continued)

*Primary Examiner* — Sihar A Karwan
(74) *Attorney, Agent, or Firm* — Crowell & Moring LLP

(57) ABSTRACT

An object of the present invention is to provide a vehicle control device and a vehicle control system capable of further reducing system cost in failure mitigation. The vehicle control device includes a master ECU and one or more client ECUs. The master ECU generates a safety process list on a basis of a predetermined failure operation pattern and transmits the safety process list to each of the client ECUs when detecting a failure of any one of the client ECUs, the safety process list includes one or more safety processes and an execution start time limit corresponding to each of the safety processes, each of the client ECUs switches an operation mode from a normal mode to a failure operation mode in response to reception of the safety process list, and starts execution of each of the safety processes by a corresponding execution start time limit, the failure operation pattern is configured such that each of the (Continued)

safety processes is executed by a client ECU having a memory capacity capable of executing the safety process, and the failure operation pattern is configured such that the same safety process is not executed by a plurality of client ECUs.

11 Claims, 11 Drawing Sheets

(56) References Cited

U.S. PATENT DOCUMENTS

| | | | |
|---|---|---|---|
| 10,635,109 B2* | 4/2020 | Guo | B60W 50/029 |
| 11,586,199 B2* | 2/2023 | Kusama | B60L 3/003 |
| 2005/0234622 A1* | 10/2005 | Pillar | G08G 1/20 |
| | | | 701/41 |
| 2007/0005202 A1* | 1/2007 | Breed | G07C 5/008 |
| | | | 714/25 |
| 2016/0306720 A1* | 10/2016 | Fuhrman | G06F 11/2038 |
| 2017/0297565 A1* | 10/2017 | Joyce | B60W 50/02 |
| 2018/0151074 A1* | 5/2018 | Noto | B60W 30/09 |
| 2018/0286142 A1* | 10/2018 | Pakki | B64D 45/00 |
| 2019/0185018 A1* | 6/2019 | Tao | B60W 50/14 |
| 2019/0300007 A1* | 10/2019 | Hilligardt | B60W 50/029 |
| 2020/0339140 A1* | 10/2020 | Lin | B60W 10/20 |
| 2021/0046945 A1 | 2/2021 | Ju et al. | |
| 2021/0163021 A1* | 6/2021 | Frazzoli | H04W 4/48 |

OTHER PUBLICATIONS

Japanese-language Written Opinion (PCT/ISA/237) issued in PCT Application No. PCT/JP2022/009299 dated Apr. 19, 2022 with English translation (6 pages).

* cited by examiner

EXPRESSWAY

AUTOMATIC STOP

ECU(AD) FAILURE

FIG. 10A

| FAILED ECU | FAILURE OPERATION MODE | SAFETY PROCESS TRANSFER DESTINATION | | | |
|---|---|---|---|---|---|
| | | AD-ECU | FIRST DVCU | SECOND DVCU | ... |
| AD-ECU | 1 | NONE | SM1 | SM2 | ... |
| AD SENSOR | 2 | STOP | SM3 | SM4 | ... |
| ... | ... | ... | ... | ... | ... |

FIG. 10B

| FAILURE OPERATION MODE | SAFETY PROCESS | EXECUTION START TIME LIMIT |
|---|---|---|
| 1 | SM1 | 100ms |
| 1 | SM2 | 100ms |
| ... | ... | ... |

VEHICLE CONTROL DEVICE AND VEHICLE CONTROL SYSTEM

TECHNICAL FIELD

The present invention relates to a vehicle control device and a vehicle control system.

BACKGROUND ART

In an in-vehicle E/E (electrical and electronic) system, an architecture using a vehicle server and a zone gateway is known. This architecture executes a wide range of applications that cover engines, chassis, vehicle body, comfort, Advanced Driver Assistance System (ADAS), Autonomous Driving (AD), etc.

The vehicle server and the zone gateway are configured using an electronic control unit (ECU). When any of the ECUs fails, another ECU may execute a function that the failed ECU has executed so far. PTL 1 describes an example of such a technique.

CITATION LIST

Patent Literature

PTL 1: U.S. Pat. No. 9,563,523

SUMMARY OF INVENTION

Technical Problem

However, the conventional technique has a problem that the system cost is high.

For example, in PTL 1, all of the main unit, the sub unit, and the backup unit need to have the same hardware resource in order to mitigate the failure, and the resource request is maximized.

The present invention has been made to solve such a problem, and an object of the present invention is to provide a technique capable of further reducing a system cost in failure mitigation.

Solution to Problem

A vehicle control device according to the present invention is a vehicle control device including a master ECU and one or more client ECUs, in which the master ECU generates a safety process list on the basis of a predetermined failure operation pattern and transmits the safety process list to each of the client ECUs when detecting a failure of any one of the client ECUs, the safety process list includes one or more safety processes and an execution start time limit corresponding to each of the safety processes, each of the client ECUs switches an operation mode from a normal mode to a failure operation mode in response to reception of the safety process list, and starts execution of each of the safety processes by a corresponding execution start time limit, the failure operation pattern is configured such that each of the safety processes is executed by a client ECU having a memory capacity capable of executing the safety process, and the failure operation pattern is configured such that the same safety process is not executed by a plurality of client ECUs. A vehicle control system according to the present invention includes a plurality of the above-described vehicle control devices.

The present specification includes the disclosure of Japanese Patent Application No. 2021-096584 on which priority of the present application is based.

Advantageous Effects of Invention

According to the present invention, it is possible to further increase the utilization efficiency of the hardware resources in the ECU alternative operation when a failure occurs.

BRIEF DESCRIPTION OF DRAWINGS

FIGS. 10A and 10B are examples of a failure operation pattern according to the first embodiment.

FIG. 12 is an example

DESCRIPTION OF EMBODIMENTS

Hereinafter, embodiments of the present invention will be described with reference to the accompanying drawings. The following is an example and does not limit the present invention.

First Embodiment

Figure 1:
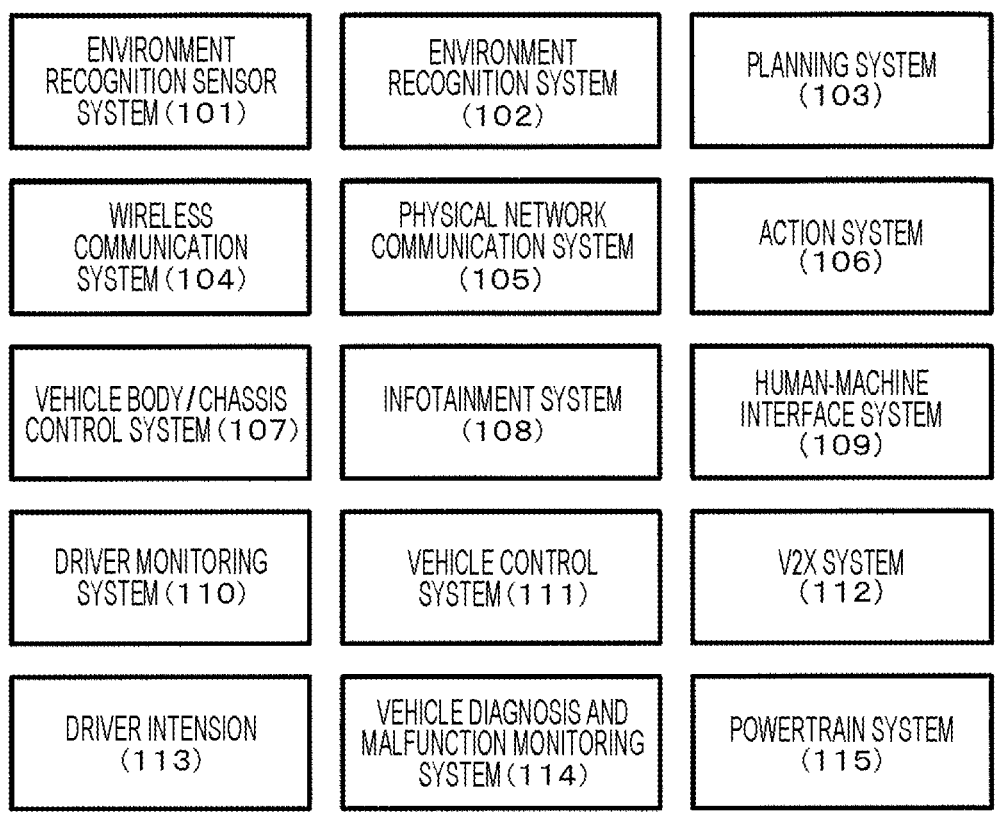
FIG. 1 is an example of various modules arranged in an autonomous driving support system including a vehicle control device according to a first embodiment of the present invention.

FIG. 1 illustrates an example of various modules arranged in an autonomous driving support system including a vehicle control device according to a first embodiment of the present invention. The first embodiment may integrate smart infrastructure, connected services, cloud-based autonomous driving applications into an in-vehicle AD/ADAS program to extend autonomous driving capabilities of a vehicle.

AD means, for example, autonomous driving, and ADAS means, for example, an advanced driver assistance system. In the present specification, the program means, for example, an application program, but is not limited thereto.

For optimal utilization of in-vehicle electrical and electronic (E/E) resources and for secure integration and in-vehicle AD/ADAS extended mode transition, the vehicle can execute or derive in-vehicle E/E resources and network resources.

Similarly, the vehicle may have a knowledge base of a dynamic operating and driving design domain such as an environmental condition, an environment recognition algorithm, and an optimal throughput requirement.

Based on resource the requirements and resource availability of smart infrastructure, connected services, cloud-based autonomous driving applications, the vehicle control device according to the first embodiment can allocate required resources for safety and optimal throughput.

Based on the application requirement, rerouting and scheduling of the application data are also performed.

Autonomous driving vehicles are controlled using vehicle control systems (e.g., AD/ADAS systems). The vehicle control system includes a plurality of environment recognition sensors, vehicle sensors, localization sensors, actuators (brake, steering, throttle, power train, etc.), etc. configured in a zone-based or domain-based E/E architecture.

The vehicle control system includes a plurality of modules that communicate with each other. It is beneficial to make a plurality of modules cooperate with each other. In addition, each module may include a plurality of programs that request sensor data, recognition data, plan data, application state data, and the like. The modules or programs may have one or more resource requirements and priorities in critical driving scenarios and vehicle control system states. In order to make these tasks cooperate with each other, it is beneficial to adapt the priority and deadline of each task/service depending on the state of the available resources.

For example, if a vehicle capable of communicating with the smart infrastructure or the roadside machine cloud-based remote server is traveling on a smart highway that can assist or fully take over vehicle control, the autonomous driving capabilities of the vehicle can be extended.

Depending on the resource requirements of the client application, the functional blocks according to the first embodiment can integrate the client application into the in-vehicle AD/ADAS application for safe mode transition.

For example, a smart highway may provide a highway pilot line application that can provide hands-free supercruise and lane change capabilities. In such a scenario, the on-vehicle hands-on/off ACC (Adaptive Cruise Control) (semi-autonomous driving vehicle) and LKA (Lane Keeping Assistance) are closeable. However, safety critical applications, such as AEB (automatic emergency braking) collision avoidance applications, need to cooperate with client applications.

In the combination of the client application and the in-vehicle AD/ADAS safety application, real-time/soft time delay constraint may become strict. In such a scenario, the vehicle control device according to the first embodiment can also perform scheduling and rerouting of application data.

As another example, vehicle detection using radar, LiDAR, cameras, etc., each have different network bandwidth requirements. The data size required by the radar network bandwidth for deadlines may be much smaller than for cameras. When adding a smart infrastructure client application to an in-vehicle AD/ADAS application, the AD/ADAS application may run in a minimum resource requirement mode.

Similarly, automatic stopping and optimal power utilization are also possible. In an advanced autonomous driving vehicle equipped with a fail-operational vehicle control system, the vehicle control device according to the first embodiment can use the autonomous driving capability of the smart infrastructure to reduce in-vehicle power consumption.

The vehicle control device according to the first embodiment is mounted on, for example, an automobile having autonomous driving capabilities, but is not limited to one mounted on an automobile. As another example, it can be mounted on a bus, a truck, a construction machine, a ground robot, a warehouse robot, an airplane, a helicopter, a boat, a ship, a farm machine, a service robot, a train, a golf cart, or the like.

FIG. 1 illustrates an example of various modules that can be arranged in an autonomous driving support system including a vehicle control device according to the first embodiment. The autonomous driving support system includes a vehicle control device (including, for example, an in-vehicle computer system) and a computer outside the vehicle. The autonomous driving vehicle can be set to an automated mode (normal mode) and can automatically drive the vehicle along a predefined driving scenario with or without assistance from a safety driver.

The vehicle control device includes an environment recognition sensor system 101, an environment recognition system 102 (which collects information about a driving scenario), a planning system 103, a wireless communication system 104, a physical network communication system 105, an action system 106, a vehicle body/chassis control system 107, an infotainment system 108, a human-machine interface system 109, a driver monitoring system 110, a vehicle control system 111, a V2X system 112, a driver intension 113, a vehicle diagnosis and malfunction monitoring system 114, and a powertrain system 115.

The autonomous driving vehicle can travel in any of a manual mode, a fully automatic mode, and a semi-automatic mode as a normal operation mode. The vehicle does not need to include all the modules in FIG. 1, and some of the modules may be omitted.

The autonomous driving vehicle may further include an engine, wheels, a steering wheel (steering wheel), a transmission, and the like, which may be controlled by a vehicle control system. The autonomous driving vehicle may further include a physical network (wired network) or wireless network that allows the modules to communicate with each other. The network may be redundant.

Figure 2:
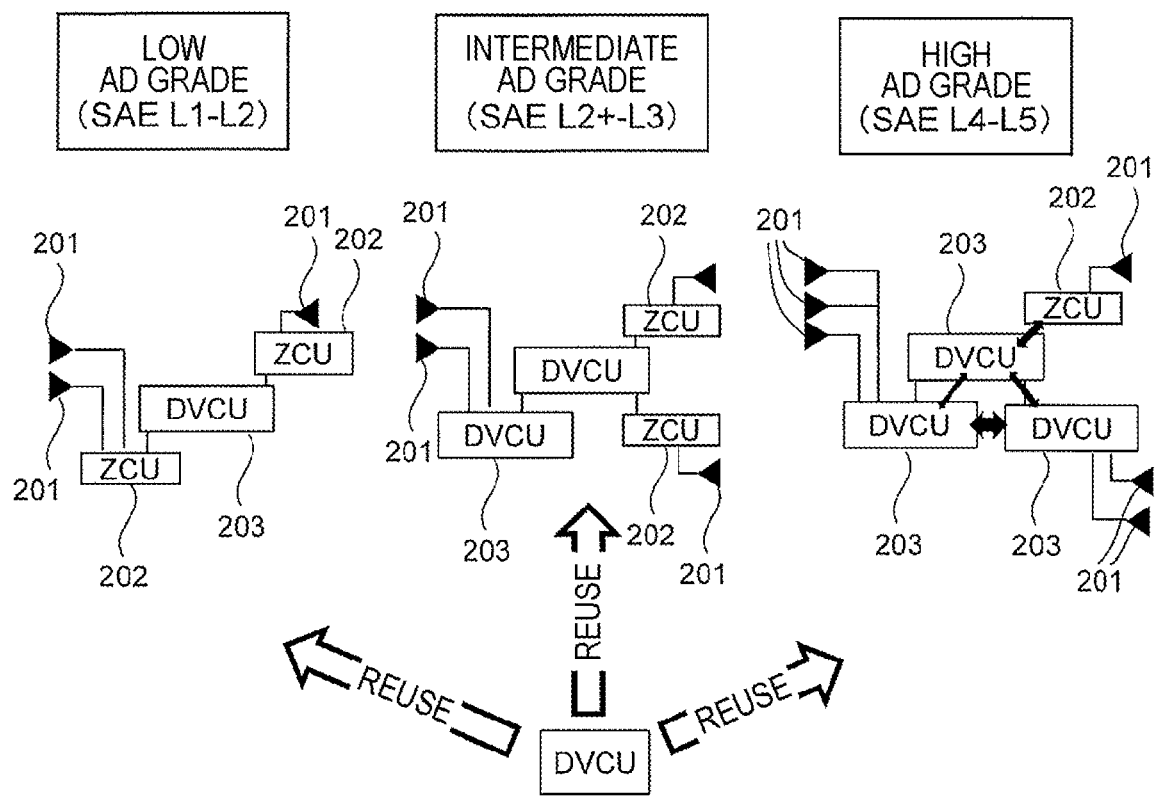
FIG. 2 is an example of a possible architecture in the vehicle control device according to the first embodiment.

FIG. 2 illustrates an example of a possible architecture in the vehicle control device according to the first embodiment. The vehicle control device includes, for example, a sensor 201, a ZCU (zone control device) 202, and a DVCU 203. The sensor 201 is, for example, a smart sensor. The DVCU 203 functions as, for example, a vehicle server and a zone gateway. Each of the ZCU 202 and the DVCU 203 includes one or more electronic control units (ECUs).

In low AD (autonomous driving) grades (SAE standards L1 to L2), only a single DVCU 203 is provided. In intermediate AD grades (SAE standards L2+ to L3), two DVCUs 203 are provided. In high AD grades (SAE standards L4 to L5), three DVCUs 203 are provided. In addition, the same DVCU 203 can be reused for a plurality of AD grades. That is, when the AD grade of the vehicle control device is updated, the hardware of the DVCU 203 used so far can be continuously used.

In the first embodiment, the software configurations of all the DVCUs 203 can be the same. That is, the program executed by any one of the DVCUs 203 can be executed by any of the other DVCUs 203. However, one program does not need to be executed by a plurality of DVCUs 203 at the same time.

According to such a configuration, the output from each sensor can be processed by any DVCU 203, and the availability of the vehicle control device is enhanced.

A plurality of vehicle control devices may be mounted on one vehicle. These vehicle control devices may constitute one vehicle control system. In that case, the vehicle control system includes a plurality of vehicle control devices according to the first embodiment. For example, each of the modules illustrated in FIG. 1 may constitute a vehicle control device, and all the modules may be integrated to constitute a vehicle control system. In this way, the unit of failure mitigation can be more freely designed.

Figure 3A:
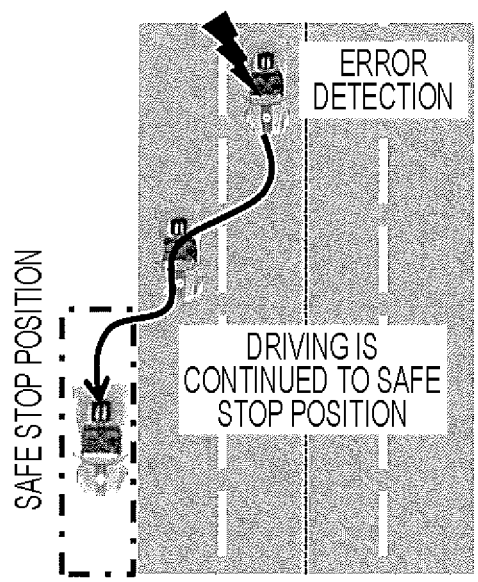
FIGS. 3A and 3B are examples of a failure operation mode according to the first embodiment.
Figure 3B:
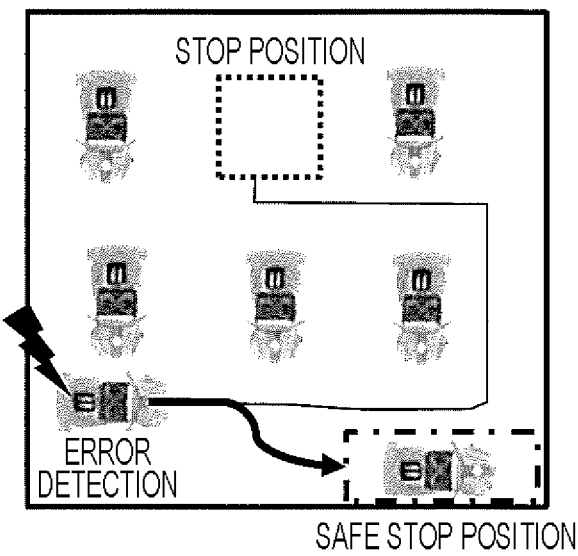

FIG. 3 illustrates an example of a failure operation mode (fail-operational mode) according to the first embodiment. In the scenario of FIG. 3(a), the vehicle is traveling on an expressway in a normal operation mode. When an error (for example, a failure of the ECU) is detected during traveling, the driving is continued in the failure operation mode until the vehicle arrives at a predetermined safe stop position. In the scenario of FIG. 3(b), when an error is detected during the execution of the automatic stop operation, the driving is continued in the failure operation mode until the vehicle arrives at a predetermined safe stop position.

Specific operations of the vehicle control device (in particular, each ECU) in the normal operation mode and the failure operation mode can be appropriately designed based on a technique known to those skilled in the art or the like.

In these failure operation modes, if the availability of the ECU is low, there is a possibility that high-level autonomous driving cannot be continued. Therefore, it is preferable to increase the availability of the ECU and to mitigate the failure.

Figure 4:
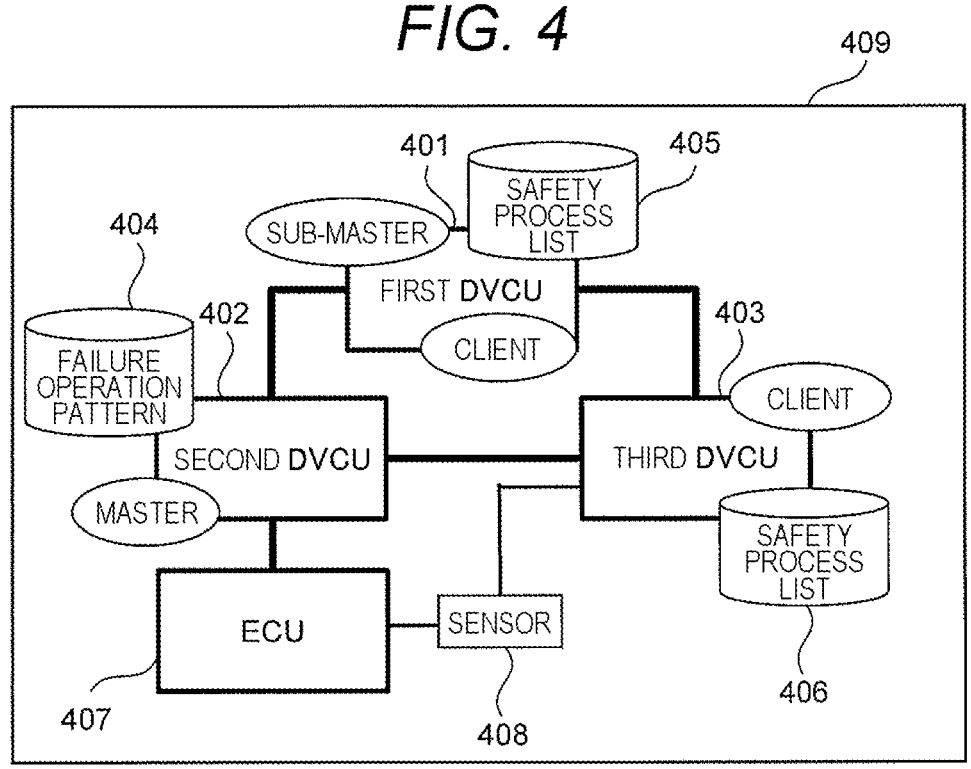
FIG. 4 is an example of a configuration of the vehicle control device according to the first embodiment.

FIG. 4 illustrates an example of a configuration of the vehicle control device according to the first embodiment. This configuration is an example of a hybrid zone architecture including a plurality of DVCUs. The vehicle control device includes a first DVCU 401, a second DVCU 402, and a third DVCU 403. Each DVCU includes one or more ECUs.

The ECU has a hardware configuration as a known computer, and includes, for example, an arithmetic device and a storage device. The arithmetic device includes, for example, a processor, and the storage device includes, for example, a storage medium such as a semiconductor memory device. A part or all of the storage medium may be a non-transitory storage medium.

One of the DVCUs includes a master ECU and the other DVCU includes a client ECU (one or more client ECUs in total). In the example of FIG. 4, the second DVCU 402 includes a master ECU and stores a failure operation pattern 404. The first DVCU 401 includes a client ECU and can store a safety process list 405. Similarly, the third DVCU 403 may include a client ECU and can store a safety process list 406.

The DVCU may be an integrated unit that functions as a vehicle server and a zone gateway. That is, at least one of the master ECU and the client ECU may be an integrated ECU that functions as a vehicle server and a zone gateway. In this way, a vehicle E/E architecture integrated by one DVCU can be implemented.

The vehicle control device may be configured to support a plurality of autonomous driving grades. For example, it is possible to support a plurality of autonomous driving grades as in FIG. 2 by reusing one or more ECUs. In this way, versatility of the vehicle control device is enhanced.

At least one of the client ECUs (in this example, the ECU of the first DVCU 401) may be a sub-master ECU. The sub-master ECU substitutes the operation of the master ECU when the master ECU fails.

The storage device of each DVCU may store a program (not illustrated). When the processor executes this program, the ECU may execute the functions described in this embodiment.

The vehicle control device includes another ECU 407 and is connected to a sensor 408. The sensor 408 is, for example, a smart sensor. In addition, the sensor 408 outputs, for example, environment recognition data. According to such a configuration, the vehicle control device can perform advanced environment recognition processing.

The first DVCU 401, the second DVCU 402, the third DVCU 403, and the ECU 407 are communicably connected directly or via another DVCU.

In the example of FIG. 4, all the DVCUs (including the master ECU and the client ECU) are configured by the same systems-on-a-chip microcomputer 409. In this way, the entire system can be configured compactly, but it is also possible not to configure the same systems-on-a-chip microcomputer.

In addition, each DVCU executes a failure allocation program and/or a run-time failure mitigation program. Details of the failure allocation program will be described later with reference to FIG. 8. Details of the run-time failure mitigation program will be described below with reference to FIG. 11.

Figure 5:
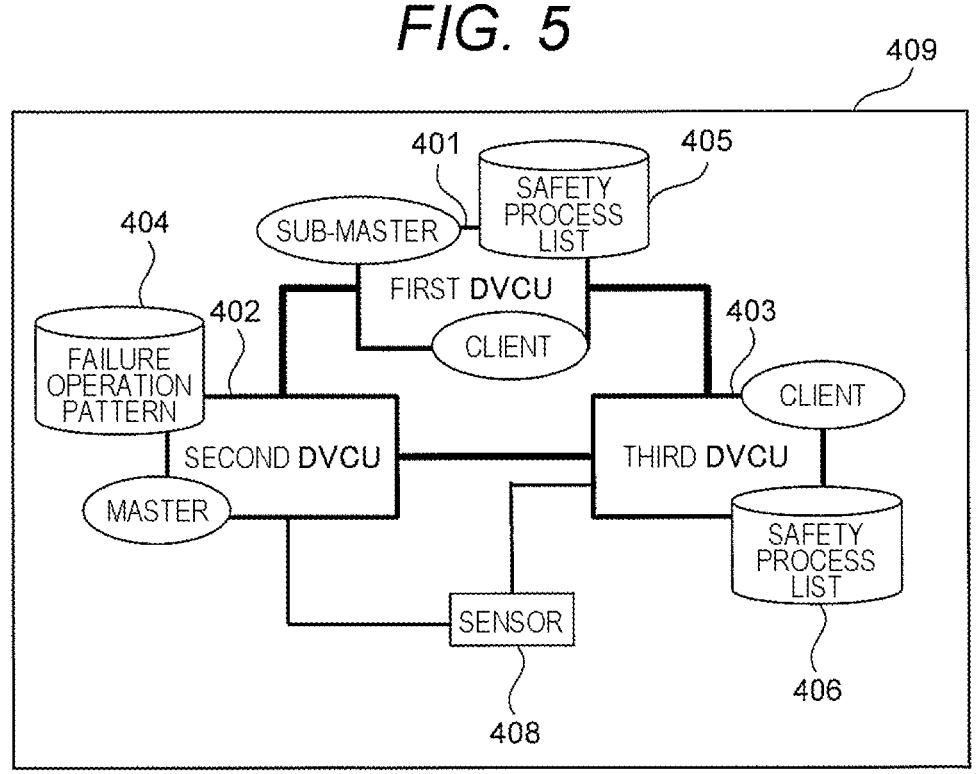
FIG. 5 is an example of a configuration of the vehicle control device according to the first embodiment.

FIG. 5 illustrates another example of the configuration of the vehicle control device according to the first embodiment. This example is a pure zone architecture and the vehicle control device does not include the ECU 407 of FIG. 4.

FIG. 6 illustrates an example of the operation of the vehicle control device according to the first embodiment. The first DVCU 601, the second DVCU 602, the third DVCU 603, and the ADAS 604 are provided. The ADAS 604 also includes an ECU. The first DVCU 601, the second DVCU 602, the third DVCU 603, and the ADAS 604 can communicate with each other. Both the second DVCU 602 and the third DVCU 603 may be in charge of power train and chassis control.

The vehicle control device executes a plurality of safety processes (safety mechanisms). The safety process constitutes, for example, a part of the AD/ADAS function. In addition, the safety process is a process for causing the vehicle to travel safely, and the safety process is executed by the ECU executing a program.

In the example of FIG. 6, safety processes SM1 and SM2 are executed. The safety process SM1 is, for example, a sensor data fusion process (for example, a process of acquiring outputs from a plurality of sensors and performing comprehensive environment recognition), and the safety process SM2 is, for example, a trajectory process (for example, a process of controlling accelerator, brake, steering, and the like). Specific examples of the safety process are not limited to those described above.

Figure 6A:
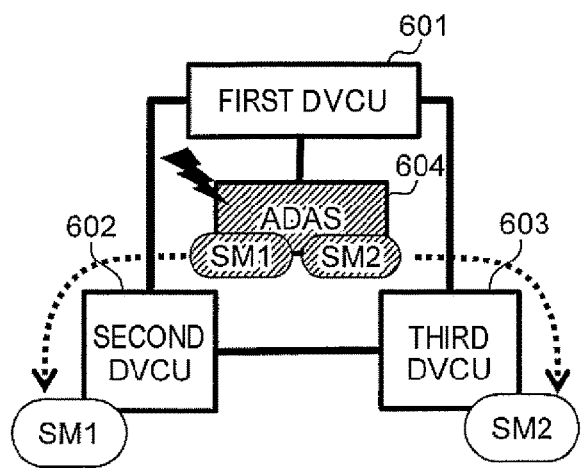
FIGS. 6A to 6D are examples of an operation of the vehicle control device according to the first embodiment.

FIGS. 6(a) to 6(d) each illustrate different failure scenarios. In the scenario of FIG. 6(a), the ADAS 604 normally executes both the safety processes SM1 and SM2. When a failure occurs in the ADAS 604, the safety process SM1 is transferred to the second DVCU 602 and the safety process SM2 is transferred to the third DVCU 603 by cooperation of the master ECU and the client ECU. A specific operation (including a method of determining the transfer destination) of each ECU at this time will be described later with reference to FIGS. 8 and 11.

Figure 6B:
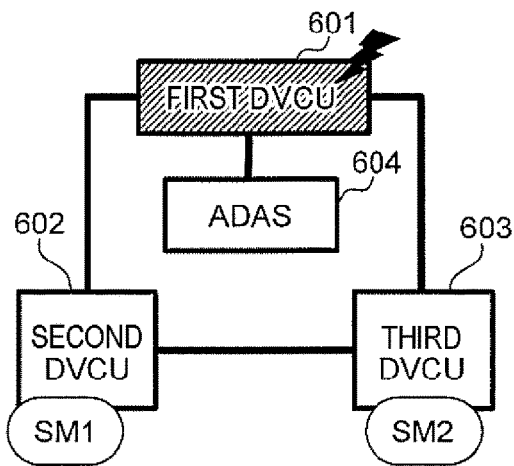

In the scenario of FIG. 6(b), normally, the second DVCU executes the safety process SM1 and the third DVCU 603 executes the safety process SM2. When the failure occurs in the first DVCU 601, neither the safety process SM1 nor the safety process SM2 is executed in the first DVCU 601, so that the transfer of the safety process does not occur.

Figure 6C:
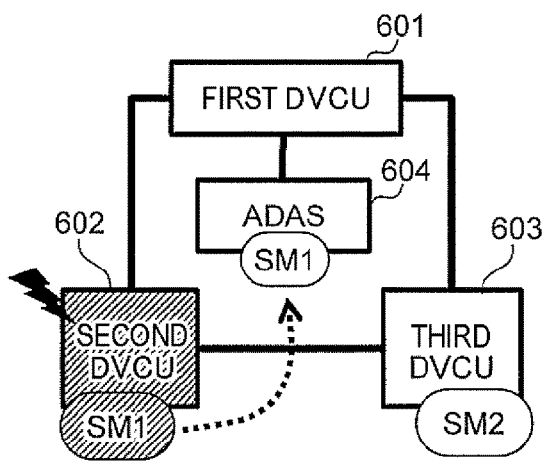

In the scenario of FIG. 6(c), normally, the second DVCU executes the safety process SM1 and the third DVCU 603 executes the safety process SM2. When the failure occurs in the second DVCU 602, the safety process SM1 is transferred to the ADAS 604 by the cooperation of the master ECU and the client ECU. The safety process SM2 is not transferred.

Figure 6D:
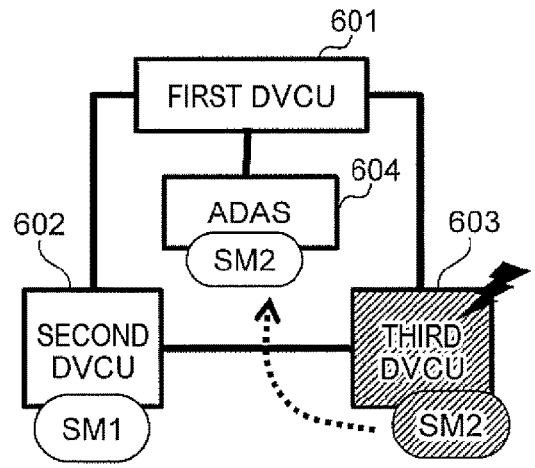

In the scenario of FIG. 6(d), normally, the second DVCU executes the safety process SM1 and the third DVCU 603 executes the safety process SM2. When the failure occurs in the third DVCU 603, the safety process SM2 is transferred to the ADAS 604 by cooperation of the master ECU and the client ECU. The safety process SM1 is not transferred.

FIG. 7 illustrates another example of the operation of the vehicle control device according to the first embodiment. This example is a pure zone architecture and the vehicle control device does not include the ADAS 604 of FIG. 6. In the example of FIG. 7, the safety process SM3 is further executed. The safety process SM3 is, for example, an adaptive cruise control (ACC) process.

Figure 7A:
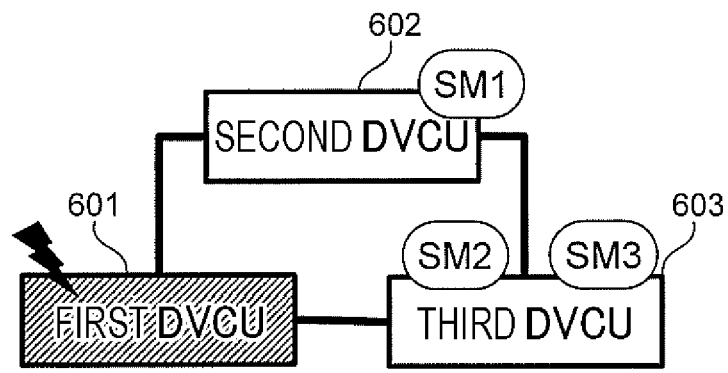
FIGS. 7A to 7C are examples of an operation of the vehicle control device according to the first embodiment.
Figure 7B:
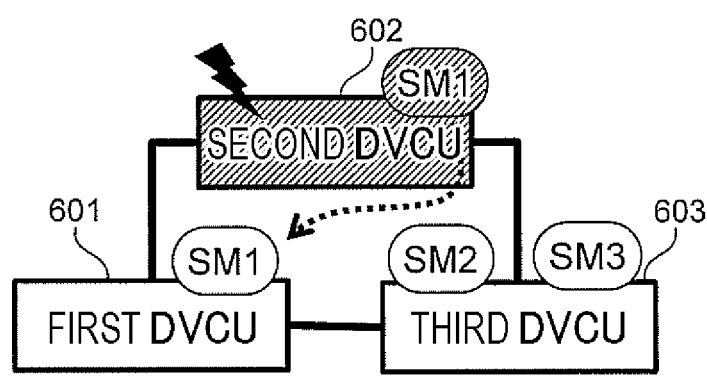
Figure 7C:
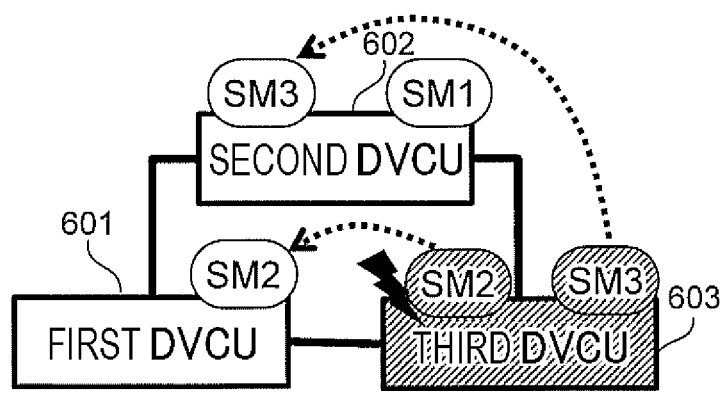

In the scenarios of FIGS. 7(a) to 7(c), normally, the second DVCU executes the safety process SM1, and the third DVCU 603 executes the safety processes SM2 and SM3.

In the scenario of FIG. 7(a), when the failure occurs in the first DVCU 601, since none of the safety processes SM1 to SM3 is executed in the first DVCU 601, the transfer of the safety process does not occur.

In the scenario of FIG. 7(b), when the failure occurs in the second DVCU 602, the safety process SM1 is transferred to the first DVCU 601 by cooperation of the master ECU and the client ECU. The safety processes SM2 and SM3 are not transferred.

In the scenario of FIG. 7(c), when the failure occurs in the third DVCU 603, the safety process SM2 is transferred to the first DVCU 601 and the safety process SM3 is transferred to the second DVCU 602 by cooperation of the master ECU and the client ECU.

As illustrated in FIGS. 6 and 7, each ECU can execute not only the safety process normally executed by itself, but also the safety process normally executed by another ECU. In particular, when both the master ECU and the client ECU are configured to be able to execute all the safety processes, versatility of each ECU is enhanced, which is preferable. Note that each safety process can be executed in a distributed manner according to the situation, and it is not necessary for one ECU to simultaneously execute all the safety processes.

Figure 8:
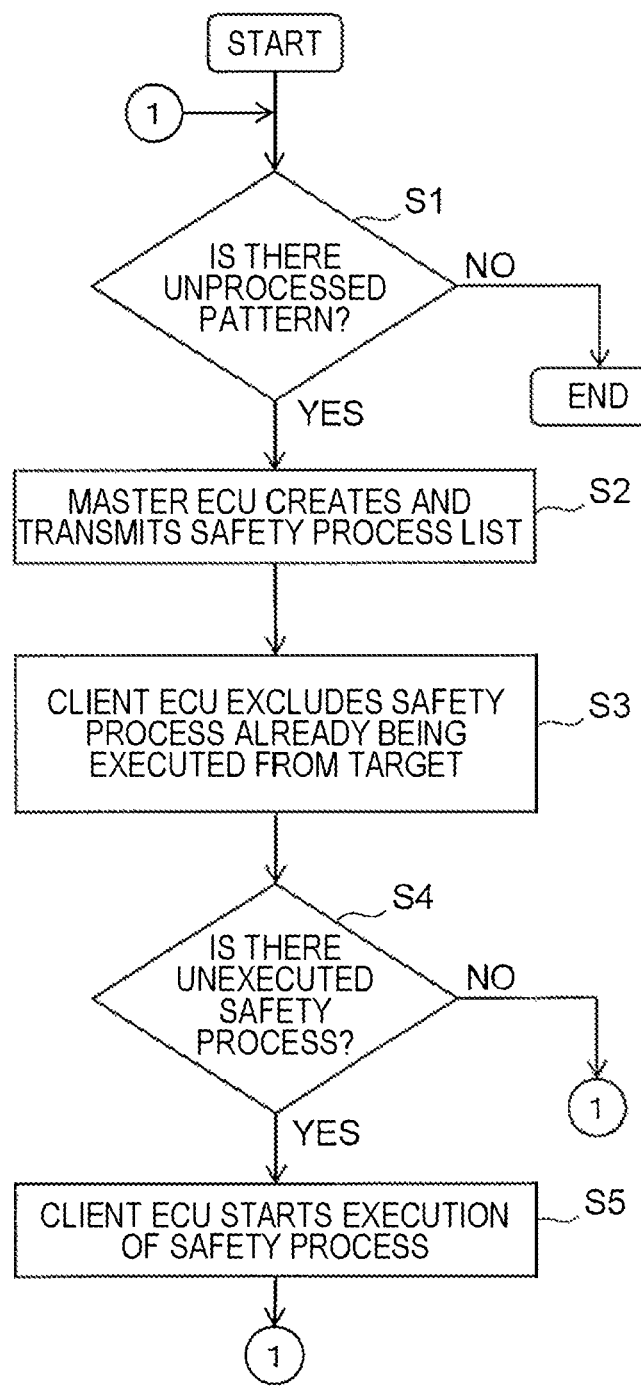
FIG. 8 is an example of a flowchart according to the first embodiment.

FIG. 8 illustrates an example of a flowchart according to the first embodiment. This flowchart describes the operation of the failure allocation program. This flowchart is executed by the master ECU and the client ECU executing the corresponding failure allocation module (the failure allocation program).

The master ECU can detect a failure of any of the client ECUs. When the master ECU monitors the client ECU and detects any failure in the client ECU, the master ECU determines whether or not there is an unprocessed failure operation pattern (S1). An example of the predetermined failure operation pattern will be described later with reference to FIG. 10 and the like.

If there is no unprocessed failure operation pattern (That is, if there is no failure operation pattern or all the detected failure operation patterns have been processed according to the flowchart of FIG. 8), the process of FIG. 8 ends.

If there is an unprocessed failure operation pattern (for example, immediately after a failure of the client ECU is detected), the master ECU generates a safety process list based on the failure operation pattern and transmits the safety process list to each client ECU (S2).

FIG. 10 illustrates an example of a failure operation pattern according to the first embodiment. FIG. 10(a) illustrates a failure operation pattern, in which information for identifying an ECU that has failed, information for identifying a failure operation mode when the ECU has failed, and information for identifying another ECU that is a transfer destination of safety process executed by the ECU are associated with each other. Such a failure operation pattern can be defined in advance (e.g., during the design stage). The storage device of the master ECU stores the failure operation pattern.

For example, when the client ECU in charge of AD fails, the safety process SM1 is transferred to the client ECU of the first DVCU, and the safety process SM2 is transferred to the client ECU of the second DVCU.

The failure operation pattern is configured such that each safety process is performed by a client ECU having a memory capacity capable of executing the safety process. For example, in the design stage, for each client ECU, in addition to all the software that the client ECU executes in the normal operation mode, when all the safety processes that may be executed simultaneously are executed simultaneously, the failure operation pattern can be designed so that the memory capacity of the client ECU is not insufficient.

In addition, the failure operation pattern is configured such that the same safety process is not executed by a plurality of client ECUs. For example, in the example of FIG. 10, the safety processes allocated to the first DVCU and the second DVCU are different from each other. In particular, it is preferable that the same safety process is not allocated to a plurality of client ECUS, that: is, the same safety process is not simultaneously stored in storage devices (for example, main storage devices) of the plurality of client ECUs because hardware resources can be reduced.

FIG. 10(b) shows an execution start time limit, and shows a time limit (execution start time limit) until each safety process is started to be executed in the client ECU of the transfer destination. Such an execution start time limit can be defined in advance (for example, at a design stage). The storage device of the master ECU stores the execution start time limit.

The safety process list transmitted to each client ECU includes one or more safety processes to be started to be executed in each client ECU and an execution start time limit corresponding to each safety process. For example, in the example of FIG. 10, when the ECU in charge of the AD fails, a safety process list indicating that the execution of the safety process SM1 should be started and that the execution start time limit is 100 ms is transmitted to the ECU of the first DVCU. Similarly, a safety process list indicating that the execution of the safety process SM2 should be started and that the execution start time limit is 100 ms is transmitted to the ECU of the second DVCU.

The measurement start timing of the execution start time limit can be designed as appropriate. For example, the timing may be the time when the master ECU detects the failure, the time when the master ECU transmits the safety process list, or another time.

In response to receiving the safety process list, the client ECU switches the operation mode from the normal operation mode to the failure operation mode (e.g., as described in relation to FIG. 3). Similarly, the master ECU may switch the operation mode from the normal operation mode to the failure operation mode when transmitting the safety process list.

Then, the client ECU excludes, from the processing target, the safety process already being executed among the safety processes included in the safety process list (S3). Here, the "processing target" means a target of processes of S4 and S5 described later. With such exclusion, redundant execution of safety processes is prevented, and the ECU with low hardware resources can be effectively used.

Next, the client ECU determines whether or not there is an unexecuted safety process (S4). When all the safety processes included in the safety process list have started to be executed, the process returns to S1.

If there is an unexecuted safety process, the client ECU starts execution of the safety process (S5). At this time, the client ECU starts to execute each safety process by the corresponding execution start time limit. The client ECU may transmit a notification (safety process execution start completion notification) indicating that the execution start of the safety process is completed to the master ECU after starting the execution of the safety process for each of the instructed safety processes. Thereafter, the process returns to S1.

Figure 9A:
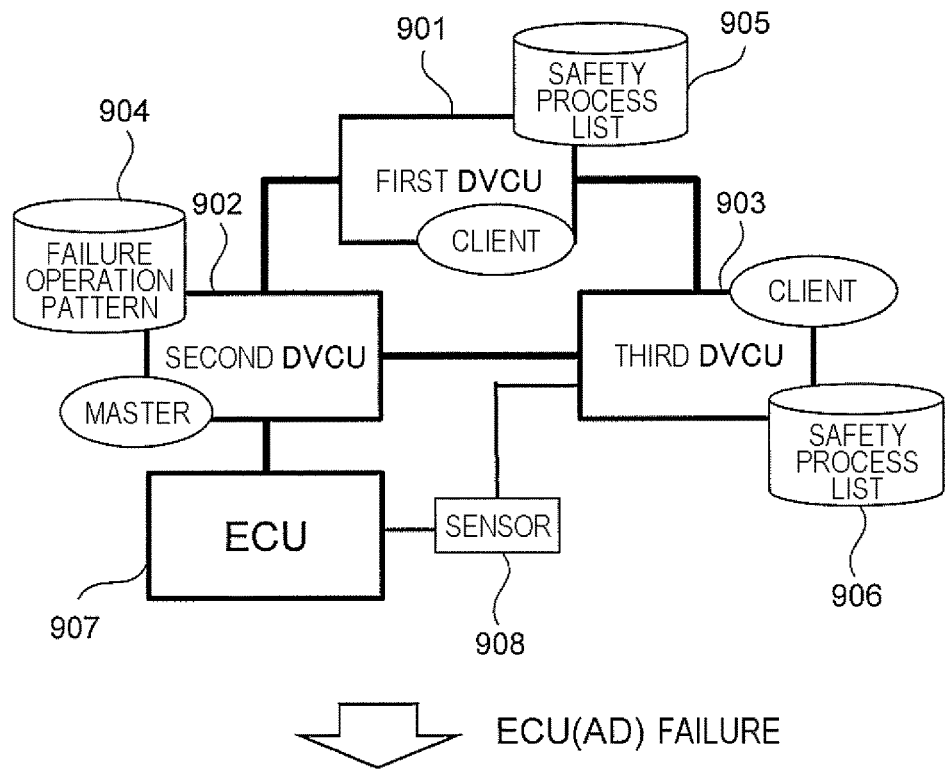
FIGS. 9A and 9B are examples of an operation of the vehicle control device according to the first embodiment.

FIG. 9 illustrates an example of the operation of the vehicle control device according to the first embodiment implemented by the processing in FIG. 8. FIG. 9(a) illustrates a normal operation mode. The vehicle control device includes a first DVCU 901, a second DVCU 902, a third DVCU 903, an ECU 907, and a sensor 908. The second DVCU 902 includes a master ECU and stores a failure operation pattern 904. The first DVCU 901 and the third DVCU 903 each include a client ECU.

Figure 9B:
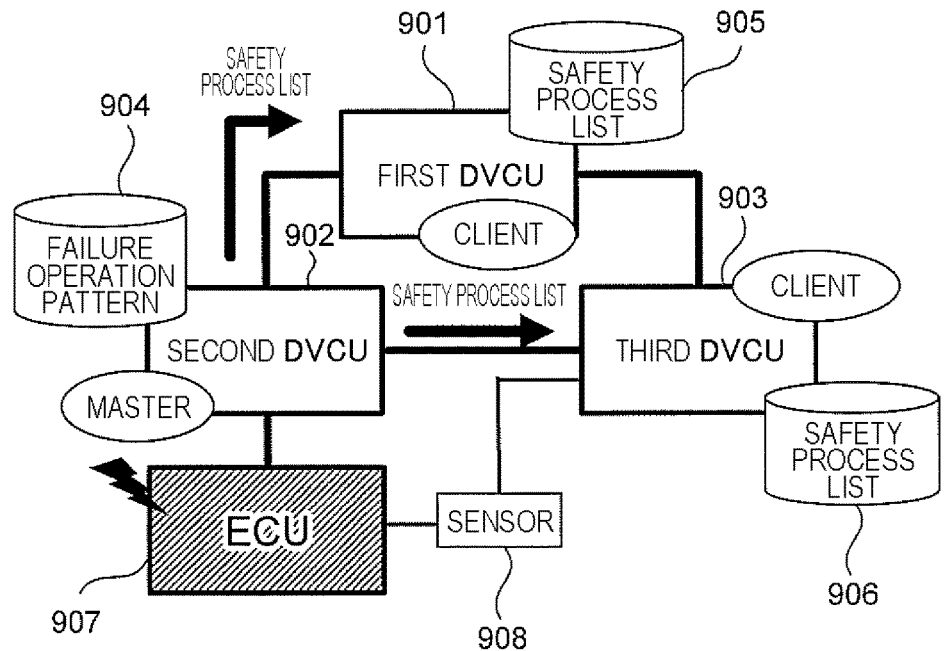

In this example, it is assumed that the ECU 907 has failed. FIG. 9(b) illustrates a failure operation mode. The second DVCU 902 (strictly, the master ECU) detects a failure in the ECU 907, transmits the safety process list 905 to the first DVCU 901, and transmits the safety process list 906 to the third DVCU 903. The first DVCU 901 stores the safety process list 905, and the third DVCU 903 stores the safety process list 906. The first DVCU 901 and the third DVCU 903 execute safety processes according to the safety process lists 905 and 906, respectively.

As described above, according to the vehicle control device according to the first embodiment, by appropriately designing the failure operation pattern, the safety process can be transferred according to the hardware resource of each ECU, and the overlapping of the safety processes does not occur. Therefore, the utilization efficiency of the hardware resource can be further increased in the ECU alternative operation at the time of occurrence of the failure.

Note that there is a possibility that the processing of FIG. 8 cannot be executed when the master ECU fails. When any one of the client ECUs is the sub-master ECU, the sub-master ECU may be configured to execute the processing of FIG. 8 instead of the master ECU. That is, when detecting a failure in the master ECU, the sub-master ECU may generate a safety process list and transmit the safety process list to each of the other client ECUs. According to such a configuration, it is possible to cope with failures of all ECUs including the master ECU.

Figure 11:
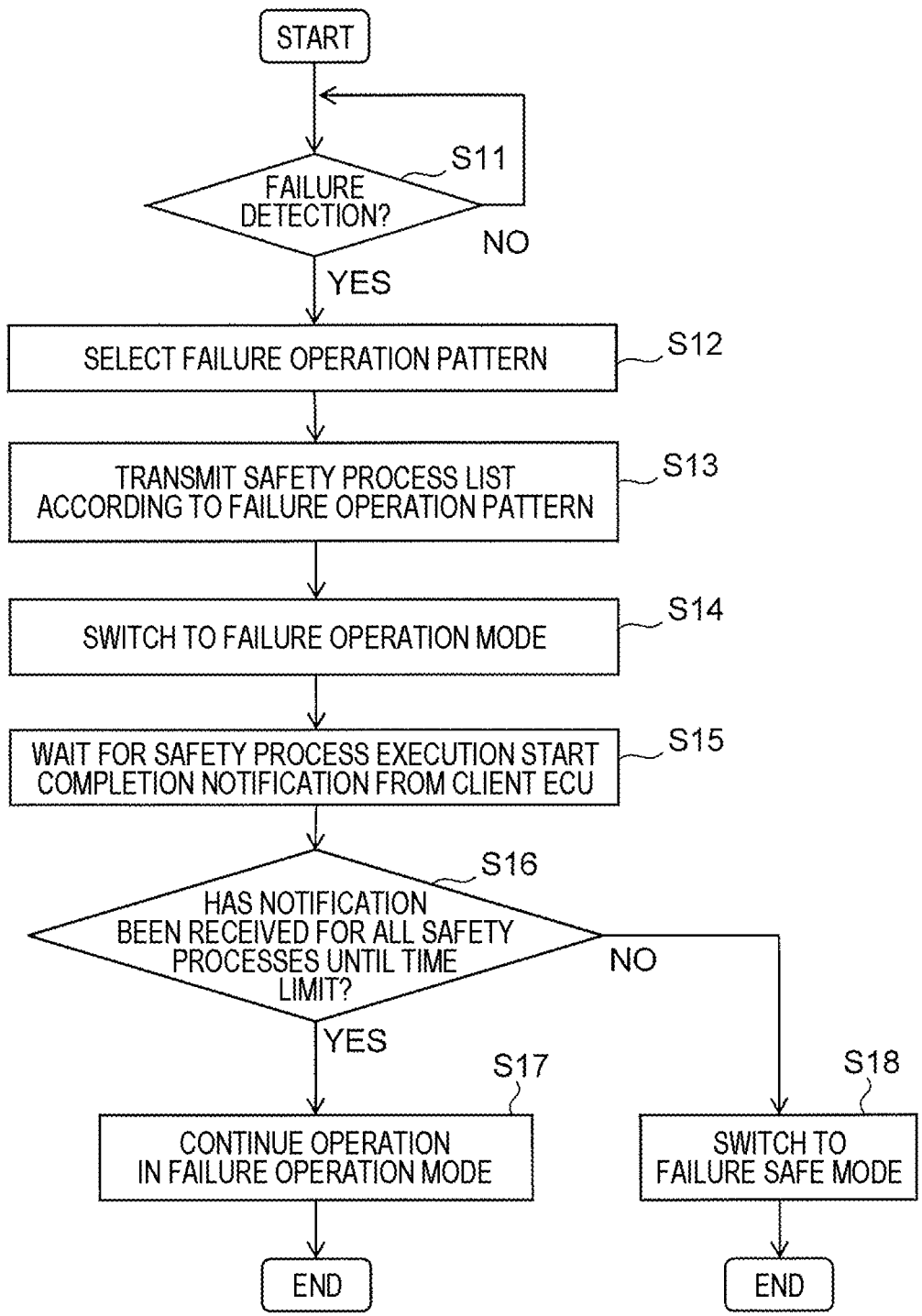
FIG. 11 is an example of a flowchart according to the first embodiment.

FIG. 11 illustrates another example of the flowchart according to the first embodiment. This flowchart describes the operation of the run-time failure mitigation program. This flowchart is executed by the master ECU and the client ECU executing corresponding failure 1 mitigation modules (failure mitigation programs).

The master ECU determines whether or not a failure of the client ECU is detected (S11). When no failure is detected, S11 is repeated. When a failure is detected, a failure operation pattern is selected according to the failed client ECU (S12). For example, in the example of FIG. 10, in a case where the ECU in charge of the AD fails, the failure operation pattern corresponding to the failure operation mode "1" is selected.

Next, the master ECU creates a safety process list according to the selected failure operation pattern, and transmits the safety process list to each client ECU (S13). This process is performed similarly to S2 in FIG. 8, for example. Next, the master ECU switches the operation mode from the normal operation mode to the failure operation mode (S14). Similarly, the client ECU may switch the driving operation mode from the normal operation mode to the failure operation mode in response to the reception of the safety process list.

Although not illustrated in FIG. 11, each client ECU starts execution of the safety process by executing the processing of S3 to S5 of FIG. 8, and transmits a safety process execution start completion notification to the master ECU. The master ECU waits for a safety process execution start completion notification from each client ECU and receives the safety process execution start completion notification (S15).

The master ECU determines whether or not a safety process execution start completion notification has been received by the corresponding execution start time limit for all the safety processes (S16). When the safety process execution start completion notification is received for all the safety processes by the corresponding execution start time limit, the master ECU continues the operation in the failure operation mode (S17) and ends the processing of FIG. 11.

Otherwise (that is, when the safety process execution start completion notification has not been received by the corresponding execution start time limit for any of the safety processes. This includes a case where the safety process execution start completion notification has not been received for any of the safety processes and a case where the safety process execution start completion notification has been received after the corresponding execution start time limit has passed for any of the safety processes), the operation mode of the vehicle control device is switched from the failure operation mode to the failure safe mode (fail-safe mode) (S18).

The specific operation content of the failure safe mode can be appropriately designed by a person skilled in the art based on a known technique or the like, but for example, a take-over request for driving may be made to the passenger. In this way, even in a case where the execution start of the safety process has not been appropriately performed, a safe response can be taken.

FIG. 12 illustrates an example of a backup storage system according to the first embodiment. The vehicle control device may include a storage device that stores a backup of all software (including each safety process) executed by the master ECU and the client ECU.

Figure 12A:
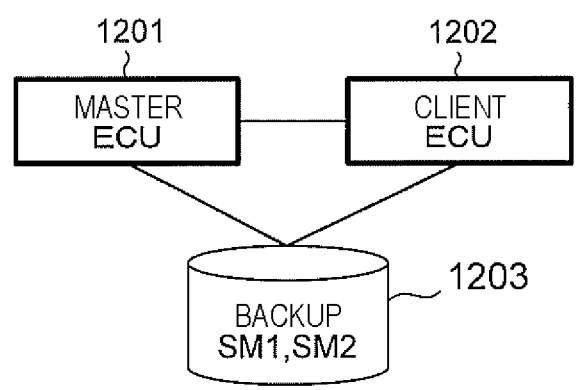
FIGS. 12A and 12B are examples of a backup storage system according to the first embodiment.

FIG. 12(a) illustrates a centralized method. The vehicle control device includes a storage device 1203. The storage device 1203 is accessible from all of the master ECU 1201 and the client ECU 1202. The storage device 1203 stores a copy of a binary file (file in an executable format) for all software (including the safety processes SM1 and SM2) executed by the master ECU 1201 and the client ECU 1202.

Figure 12B:
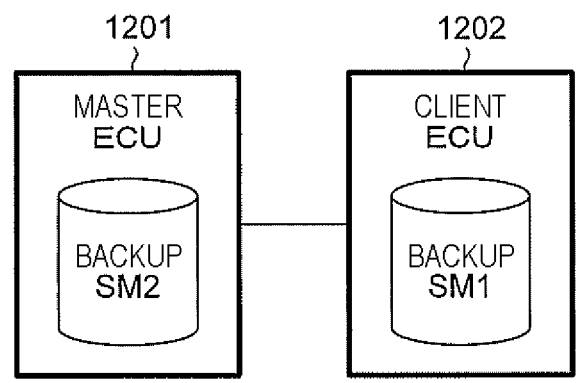

FIG. 12(b) illustrates a distribution method. The vehicle control device stores a copy of a binary file of all software executed by the master ECU 1201 and the client ECU 1202 in a distributed manner in respective storage devices (for example, main storage devices) of the master ECU 1201 and the client ECU 1202. In this example, the master ECU 1201 executes the safety process SM1 at the normal time, and can further execute the safety process SM2 in the failure operation mode.

REFERENCE SIGNS LIST

- 101 environment recognition sensor system
- 102 environment recognition system
- 103 planning system
- 104 wireless communication system
- 105 physical network communication system
- 106 action system
- 107 vehicle body/chassis control system
- 108 infotainment system
- 109 human-machine interface system
- 110 driver monitoring system
- 111 vehicle control system
- 112 V2X system
- 113 driver intension
- 114 malfunction monitoring system
- 115 powertrain system
- 201 sensor
- 202 ZCU
- 203 DVCU
- 401 first DVCU
- 402 second DVCU
- 403 third DVCU
- 404 failure operation pattern
- 405 safety process list
- 406 safety process list
- 407 ECU
- 408 sensor
- 409 systems-on-a-chip microcomputer
- 601 first DVCU
- 602 second DVCU
- 603 third DVCU
- 604 ADAS
- 901 first DVCU
- 902 second DVCU
- 903 third DVCU
- 904 failure operation pattern
- 905 safety process list
- 906 safety process list
- 907 ECU
- 908 sensor
- SM1 safety process
- SM2 safety process
- SM3 safety process
- 1201 master ECU
- 1202 client ECU
- 1203 storage device All publications, patents, and patent applications cited herein are hereby incorporated by reference in their entirety.

The invention claimed is:

1. A vehicle control device comprising a master ECU and one or more client ECUS,
wherein the master ECU generates a safety process list on a basis of a predetermined failure operation pattern and transmits the safety process list to each of the client ECUs when detecting a failure of any one of the client ECUs,
the safety process list includes one or more safety processes and an execution start time limit corresponding to each of the safety processes,
each of the client ECUs switches an operation mode from a normal mode to a failure operation mode in response to reception of the safety process list, and starts execution of each of the safety processes by a corresponding execution start time limit,
the failure operation pattern is configured such that each of the safety processes is executed by a client ECU having a memory capacity capable of executing the safety process, and
the failure operation pattern is configured such that a same safety process is not executed by a plurality of client ECUs.

2. The vehicle control device according to claim 1, wherein
each of the client ECUs transmits a safety process execution start completion notification to the master ECU after starting execution of the safety process for each of the safety processes, and
the master ECU continues an operation in the failure operation mode in a case where the master ECU has received the safety process execution start completion notification before the execution start time limit corresponding to all the safety processes, and switches the operation mode to a failure safe mode in a case where the master ECU has not received the safety process execution start completion notification before the execution start time limit corresponding to any one of the safety processes.

3. The vehicle control device according to claim 1, wherein the master ECU and each of the client ECUs are all configured by an identical systems-on-a-chip microcomputer.

4. The vehicle control device according to claim 1, wherein
at least one of the one or more client ECUs is a sub-master ECU, and
the sub-master ECU, when detecting a failure of the master ECU, generates the safety process list and transmits the safety process list to each of the other client ECUs.

5. A vehicle control system comprising a plurality of the vehicle control devices according to claim 1.

6. The vehicle control device according to claim 1, wherein at least one of the master ECU and the client ECU is an integrated ECU that functions as a vehicle server and a zone gateway.

7. The vehicle control device according to claim 6, wherein the vehicle control device corresponds to a plurality of autonomous driving grades.

8. The vehicle control device according to claim 1, wherein the vehicle control device is connected to a smart sensor that outputs environment recognition data.

9. The vehicle control device according to claim 1, wherein the master ECU and the one or more client ECUs are both configured to be capable of performing all the safety processes.

10. The vehicle control device according to claim 1, wherein the vehicle control device includes a storage device that stores a backup of all software executed by the master ECU and the one or more client ECUs.

11. The vehicle control device according to claim 1, wherein the vehicle control device stores, for all software executed by the master ECU and the one or more client ECUs, a copy of a binary file in a storage device accessible from all of the master ECU and the one or more client ECUs, or stores the copy in a distributed manner in a storage device of each of the master ECU and the one or more client ECUs.

* * * * *